United States Patent

Hamasaki et al.

[11] Patent Number: 5,902,171
[45] Date of Patent: May 11, 1999

[54] METHOD AND APPARATUS FOR SLICING A WORK

[75] Inventors: Tatsumi Hamasaki; Yoshihiro Tadera; Yukinori Imada; Keishi Kawaguchi, all of Hiroshima, Japan

[73] Assignee: Toyo Advanced Technologies Co Ltd., Hiroshima-ken, Japan

[21] Appl. No.: 08/918,923

[22] Filed: Aug. 26, 1997

Related U.S. Application Data

[63] Continuation of application No. 08/532,445, Sep. 22, 1995, abandoned.

[30]     Foreign Application Priority Data

Sep. 28, 1994 [JP] Japan .................................... 6-233593

[51] Int. Cl.$^6$ ...................................................... B28D 1/02
[52] U.S. Cl. .............................. 451/5; 451/10; 125/13.02
[58] Field of Search ................................... 451/5, 1, 8, 9, 451/10, 11; 125/23.01, 13.02

[56]              References Cited

U.S. PATENT DOCUMENTS

| 4,844,047 | 7/1989 | Brehm et al. ........................ 125/13.02 |
| 4,991,475 | 2/1991 | Malcok et al. ....................... 125/13.02 |
| 5,025,593 | 6/1991 | Kawaguchi et al. ...................... 451/11 |

FOREIGN PATENT DOCUMENTS

| 0275010 | 11/1989 | Japan ................................. 125/23.01 |
| 6106524 | 4/1994 | Japan ................................. 125/23.01 |

Primary Examiner—Robert A. Rose
Attorney, Agent, or Firm—Jordan and Hamburg LLP

[57]                    ABSTRACT

An apparatus for slicing a work includes: a blade member rotating device which rotates a blade member having an internal circular cutting edge; a radial moving device which produces a relative movement between the blade member and a work in a radial direction of the blade member to cut an end portion of the work; an axial moving device which produces a relative movement between the blade member and the work in an axial direction of the blade member; a displacement detector which detects an axial displacement of an inner portion of the rotating blade member; a rotational controller which controls the rotational speed of the blade member based on a detected axial displacement to reduce the axial displacement; and an axial movement controller which controls the axial relative movement between the blade member and the work based on the detected axial displacement so that an actual cutting position of the internal cutting edge with respect to the work is at a predetermined cutting reference position.

20 Claims, 9 Drawing Sheets

PRIOR ART

FIG. 9A

PRIOR ART

METHOD AND APPARATUS FOR SLICING A WORK

This application is a continuation of application Ser. No. 08/532,445 filed Sep. 22, 1995 now abandoned.

BACKGROUND OF THE INVENTION

The present invention relates to a method and apparatus for slicing a work, such as semiconductor ingot, to produce a semiconductor wafer.

Conventionally, there have been known slicing apparatus in which a work is placed in a central hole of a flat, circular, ringed blade member having an internal cutting edge at an internal circumferential periphery thereof so as to slightly cross over the internal cutting edge in an axial direction of the blade member, and is moved against the internal cutting edge in a radial direction of the rotating blade member to produce a wafer.

In such a slicing apparatus, the blade member is likely to flex during cutting operation, which consequently causes a deterioration in the machining accuracy. To eliminate the deterioration, various slicing apparatus have been proposed.

For example, Japanese Unexamined Patent Publication No. 1-182011 discloses: considering the fact that the flexing direction and flexure amount of a blade member vary in accordance with the rotational speed of the blade member, the flexure amount of the blade member is detected, and the rotational speed of the blade member is feedback controlled to reduce the flexure amount, thereby suppressing flexure of the blade member.

Japanese Unexamined Patent Publication No. 4-211909 discloses that an air ejector for ejecting air under pressure onto a surface of a blade member is provided to suppress flexure of the blade member by the pressurized air.

Japanese Unexamined Patent Publication No. 1-275010 discloses that a flexure amount of a blade member is detected and a work is moved according to needs along a direction of an axis about which the blade member is rotated, i.e., in a feeding direction of the work, during cutting operation so as to reduce the flexure amount so that the thickness of a wafer cut out from the work is kept at a constant value.

In Japanese Unexamined Patent Publication No. 1-182011, the flexure of the blade member is suppressed by controlling the rotational speed of the blade member. However, in view of the fact that there is a delay in time until the flexure amount of the blade member actually changes after the rotational speed of the blade member is changed, it is difficult to set the feedback gain at a large value. Accordingly, this feedback control cannot provide the high responsiveness. This feedback control inevitably accompanies some deviation, i.e., a flexure of the blade member, and cannot consequently prevent the work from being cut at a position displaced from the determined position.

Figure 9A:
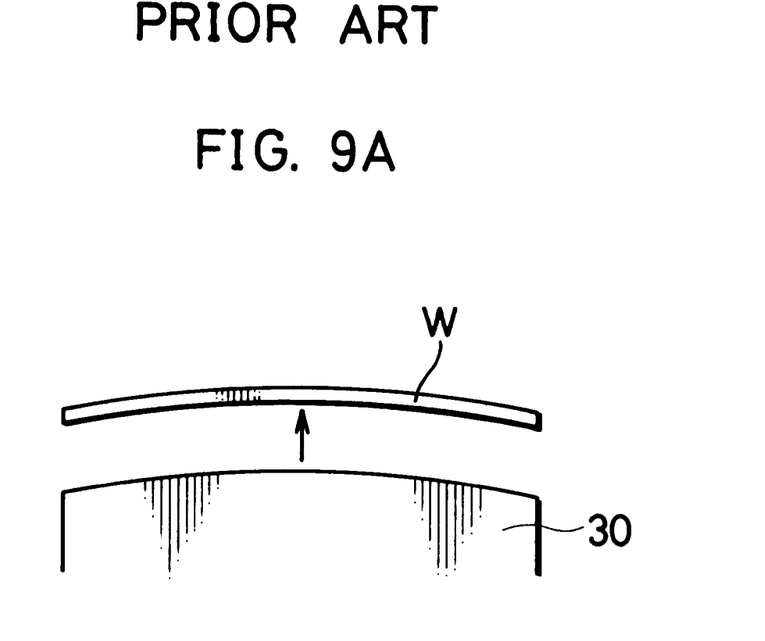
FIG. 9A is a diagram showing a wafer sliced off by a conventional slicing apparatus, the both sides of the wafer being cut by an identically flexed blade member.

It could be considered that even if the blade member is flexed during the slicing operation, wafers having the same sectional form and a uniform thickness might be produced as far as the blade member is flexed at the same flexure amount when slicing off each wafer from the work, for example, slicing off a convex wafer W as shown in FIG. 9A.

Figure 9B:
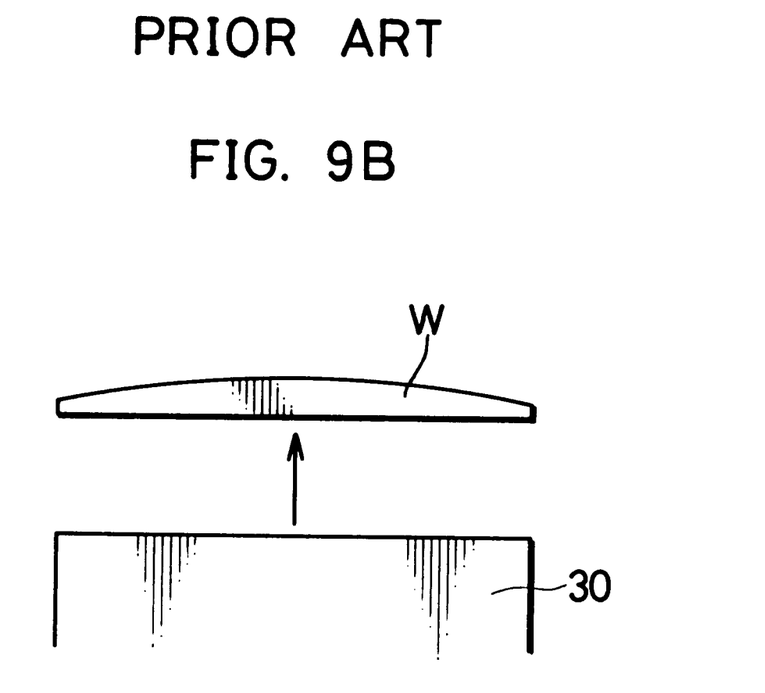
FIG. 9B is a diagram showing another wafer sliced off by a conventional slicing apparatus, one side of the wafer being cut by a flexed blade member and the other side being cut by a newly dressed blade member.

However, when an internal cutting edge of the blade member is dressed with a dress device to enhance the cutting performance and the slicing operation is carried out again by the dressed blade member, the flexure amount of the blade member will reduce at the time immediately after the dressing because the cutting performance is enhanced, and the wafer surface cut by the enhanced blade becomes consequently straight. This straight surface is different from the other convex surface of the wafer which is produced by the not-dressed cutting edge as shown in FIG. 9B. The straight surface and the convex surface result in differences in the thickness of the wafer.

Further, there is a limit in the flexure control based on the rotational speed of the blade member because the controllable rotational speed is limited. The flexure of the blade member cannot be reduced when the rotational speed is beyond the controllable speed.

These drawbacks cannot be eliminated by the slicing apparatus disclosed in Japanese Unexamined Patent Publication No. 4-211909 for the similar reasons as mentioned above.

In the slicing apparatus disclosed in Japanese Unexamined Patent Publication No. 1-275010, the position at which a wafer is sliced off from the work can be controlled. However, since the slicing operation is executed in the state that the flexure of the blade member is not substantially suppressed, the following drawbacks occur.

Figure 10A:
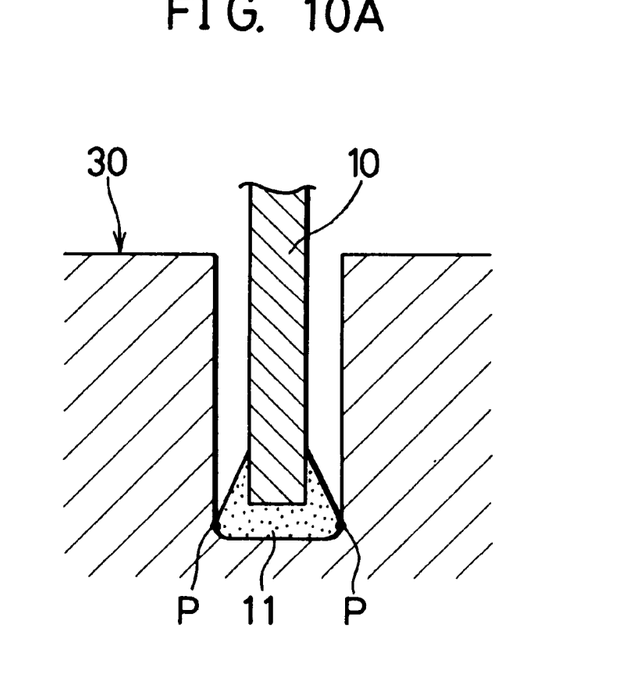
FIG. 10A is a sectional view showing how a cutting edge of a blade member in a non-flexed state does cutting.
Figure 10B:
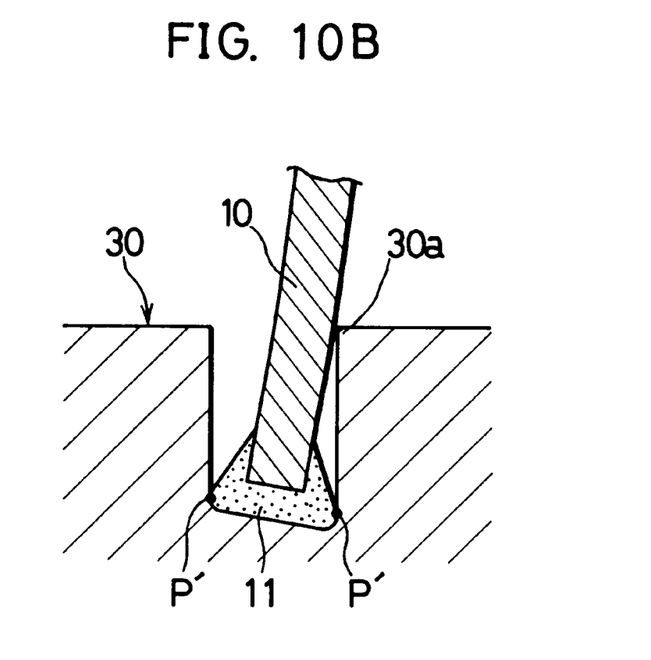
FIG. 10B is a sectional view showing how a cutting edge of a blade member in a flexed state does cutting.

As shown in FIG. 10A, an internal cutting edge 11 of the blade member 10 is designed in such a manner that both sides of the cutting edge 11 are brought into contact with the grinding points P over an entire circumference thereof in the non-flexed state which ensures most excellent cutting performance. However, when the blade member 10 is flexed in an axial direction of the blade member 10, i.e., rightward, as shown in FIG. 10B, the grinding point is displaced from the point P to the point P' due to the flexure of the blade member 10. Accordingly, the cutting Performance becomes poor, thus impairing the cutting surface of a sliced wafer.

Further, when the blade member 10 is flexed greater, a gap between the expanding side surface of the blade member 10 and a corner 30a of the work 30 becomes smaller. In the worst case, a part of the expanding side surface of the flexed blade member 10 comes into contact with the corner portion 30a, thereby damaging the blade member 10.

SUMMARY OF THE INVENTION

It is an object of the present invention to provide a method and apparatus for slicing a work which have overcome the drawbacks residing in the prior art.

It is another object of the present invention to provide a method and apparatus for slicing a work which can suppress the flexure of a blade member effectively.

It is another object of the present invention to provide a method and apparatus for slicing a work which can greatly increase the accuracy in the cutting position of a work.

The present invention is directed to a method for slicing a work comprising: rotating a blade member having an internal cutting edge in the form of a circle about a center of the circle; producing a relative movement between the blade member and a work in a radial direction of the blade member so that an end portion of the work is cut by the internal cutting edge of the blade member: detecting an axial displacement of an inner position; controlling the rotational speed of the blade member based on a detected axial displacement to reduce the axial displacement; and producing a relative movement between the blade member and the work in an axial-direction of the blade member based on the detected axial displacement so that an actual cutting position of the internal cutting edge with respect to the work is at a predetermined cutting reference position.

Also, the present invention is directed to a method for slicing a work comprising: rotating a blade member having an internal cutting edge in the form of a circle about a center of the circle; producing a relative movement between the blade member and a work in a radial direction of the blade member so that an end portion of the work is cut by the internal cutting edge of the blade member; detecting an axial displacement of an inner portion of the rotating blade member relative to a reference position; ejecting fluid to a side of the blademember based on a detected axial displacement to reduce the axial displacement; and producing a relative movement between the blade member and the work in an axial direction of the blade member based on the detected axial displacement so that an actual cutting position of the internal cutting edge with respect to the work is at a predetermined cutting reference position.

Further, the present invention is directed to an apparatus for slicing a work comprising: a blade member having an internal cutting edge in the form of a circle; a first driver which rotates the blade member about a center of the circle of the internal cutting edge; a second driver which produces a relative movement between the blade member and a work in a radial direction of the blade member so that an end portion of the work is cut by the internal cutting edge of the blade member; a third driver which produces a relative movement between the blade member and the work in an axial direction of the blade member; a displacement detector which detects an axial displacement of an inner portion of the rotating blade member relative to a reference position; a first controller which controls the rotational speed of the blade member based on a detected axial displacement to reduce the axial displacement; and a second controller which controls the axial relative movement between the blade member and the work based on the detected axial displacement so that an actual cutting position of the internal cutting edge with respect to the work is at a predetermined cutting reference position.

Further, the present invention is directed to an apparatus for slicing a work comprising: a blade member having an internal cutting edge in the form of a circle; a first driver which rotates the blade member about a center of the circle of the internal cutting edge; a second driver which produces a relative movement between the blade member and a work in a radial direction of the blade member so that an end portion of the work is cut by the internal cutting edge of the blade member; a third driver which produces a relative movement between the blade member and the work in an axial direction of the blade member; a displacement detector which detects an axial displacement of an inner portion of the rotating blade member relative to a reference position; a fluid ejector which ejects fluid to a side of the rotating blade member; a first controller which controls the fluid ejection based on a detected axial displacement to reduce the axial displacement; and a second controller which controls the axial relative movement between the blade member and the work based on the detected axial displacement so that an actual cutting position of the internal cutting edge with respect to the work is at a predetermined cutting reference position.

The predetermined cutting reference position may be continuously changed in accordance with the radial relative movement between the blade member and the work.

During the time when the work is cut by the rotating blade member, an axial/displacement of the rotating blade member is detected. The rotational speed of the blade member or the fluid ejection to the blade member is controlled based detected axial displacement to reduce the axial displacement. Further, a relative axial movement between the work and the blade member is effected based on a detected axial displacement so that an actual cutting position of the internal cutting edge with respect to the work is at a predetermined cutting reference position. This relative axial movement corrects a displacement which cannot be corrected by the rotational speed control or the fluid ejection control. Accordingly, the cutting position of the internal cutting edge is kept in the proper position, which thus assures accurate slicing of a work.

Also, the predetermined cutting reference position is continuously changed in accordance with the radial relative movement between the blade member and the work. Accordingly, it will be possible to form a desirably shaped surface on a sliced piece at a very high accuracy.

It is very difficult to form a desired shape on a surface of a sliced piece only by changing the rotational speed of the blade member or the fluid ejection to intentionally displace the blade member. This is because of the fact that even if the rotation speed of the blade member or the fluid ejection is changed, an intended displacement of the blade member cannot be obtained promptly. Also, the warping or displacement of the)blade member decreases the cutting performance of the internal cutting edge.

Accordingly, a desired shape can be easily formed on a surface of a sliced piece at a very high accuracy by producing a relative axial movement of the work and the blade member so that an actual cutting position is at a predetermined cutting reference position while controlling the displacement of the blade member as small as possible. This is because of the fact that the displacement of the blade member is suppressed and the cutting performance of the internal cutting edge thus increases.

These and other objects, features and advantages of the present invention will become more apparent upon a reading of the following detailed description and accompanying drawings.

DETAILED DESCRIPTION OF THE PREFERRED EMBODIMENTS OF THE INVENTION

Preferred embodiments of the present invention will be described with reference to the accompanying drawings.

A first embodiment of the present invention will be described with reference to FIGS. 1 to 5. A slicing apparatus, shown in FIGS. 1 and 2, comprises a base 1, on which parallel guide rails 2, 2 are provided. A slide table 3 is mounted on these guide rails 2, 2 to slide thereon.

Figure 1:
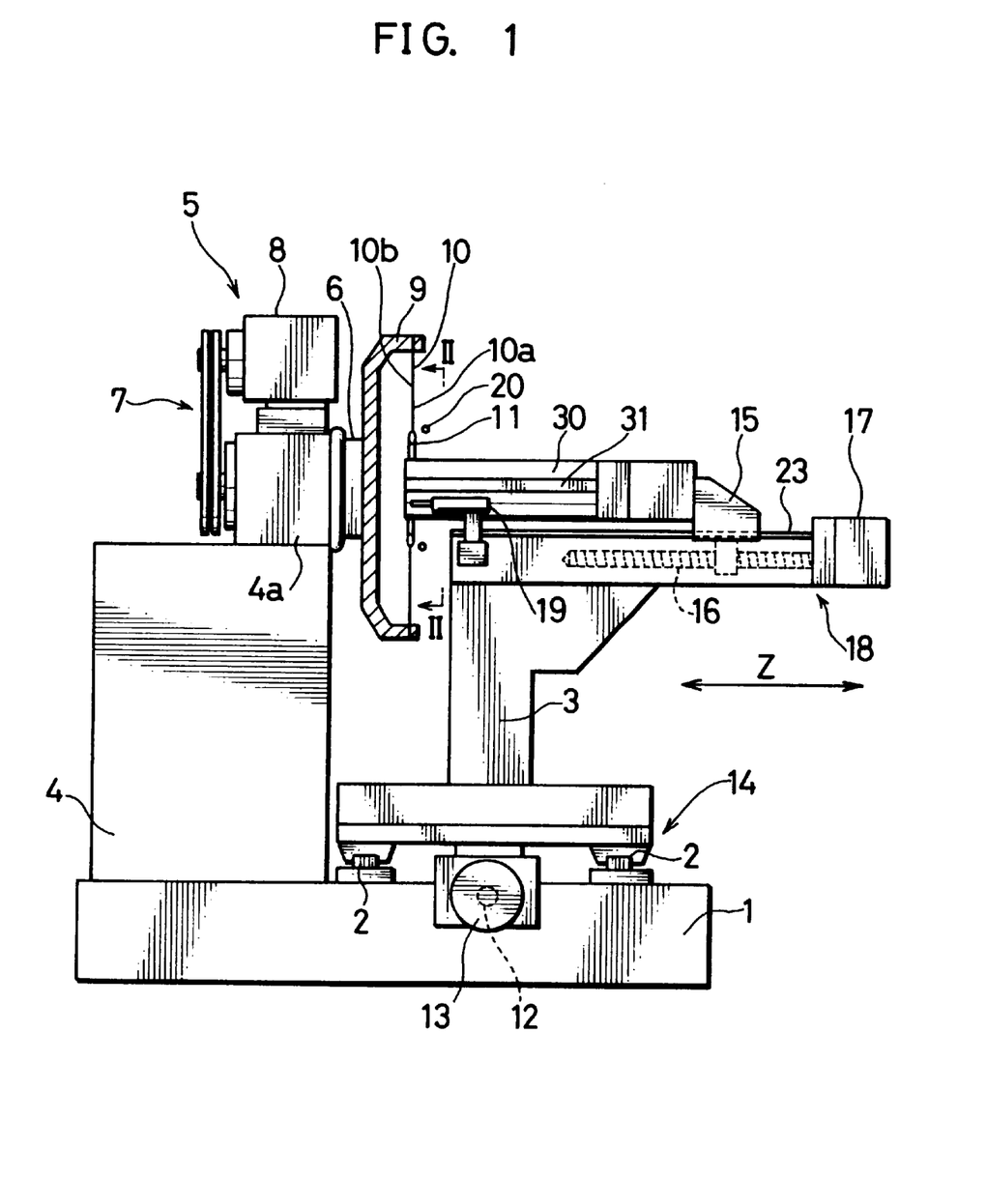
FIG. 1 is a front view showing an overall construction of a slicing apparatus as a first embodiment according to the invention.
Figure 2:
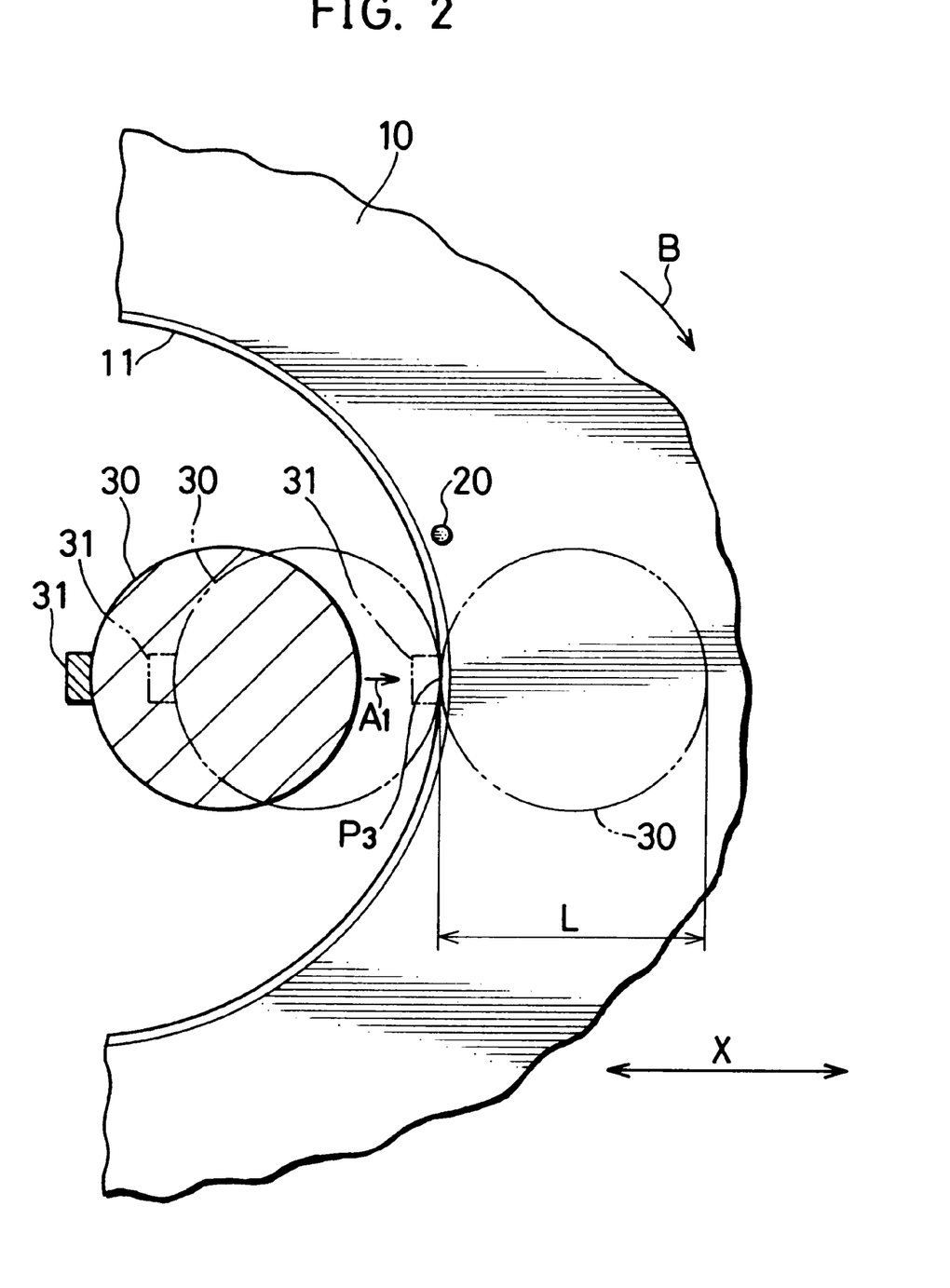
FIG. 2 is a sectional view taken along the line II—II in FIG. 1.

A main spindle base 4 is provided on the base 1 at a position facing the slide table 3. This main spindle base 4 carries a main bearing 4a. The main bearing 4a supports one end of a main spindle 6 rotatably. The main spindle 6 is driven by a spindle drive motor 8 through a belt mechanism 7 entrained between one end of the main spindle 6 and an output shaft of the spindle drive motor 8. The other end of the main spindle 6 is connected to a rotary tension disk 9. This tension disk 9, driven by means of a rotating driver 5 including the main spindle 6, the belt mechanism 7, and the spindle drive motor 8, rotates about the main spindle 6.

The tension disk 9 has a circumferential periphery on which a flat, circular, ringed blade member 10 of doughnut shape is attached. This blade member 10 has an internal cutting edge 11 secured to an internal circumferential periphery thereof. The internal cutting edge 11 is made of diamond grain or the like material.

The number of revolutions f per unit time (hereinafter referred to merely as "revolution number") of the tension disk 9 varies with time. The rotation of the tension disk 9 causes a displacement of the blade member 10 in an axial direction of the main spindle 6 or an axial direction of the blade member 10 (hereinafter referred to as "Z-axis direction"). The rotation of the tension disk 9 generates a centrifugal force acting on the circumferential periphery of the tension disk 9. The centrifugal force is in proportion with the revolution number f. Accordingly, the revolution number f determines a magnitude and direction of displacement in the Z-axis direction.

The slide table 3 carries a holding member 15 and a dividing feeder 18. The holding member 15 can slide on a guide rail 23 extending in the axial direction of the blade member 10, and holds one end of a work 30 made of silicon semiconductor ingot or the like material. The diving feeder 18 includes a ball screw 16 and a holding member drive motor 17 for rotating this ball screw 16. By this dividing feeder 18, the holding member 15 is slidably moved in the Z-axis direction so that one end of the work 30 slightly protrudes passing through a central hole of the blade member 10 from a front side 10a to a rear side 10b of the blade member 10.

The slide table 3 carries a dress device 19. The dress device 19 is provided to dress the internal cutting edge 11. The dress device 19 has a tool whose tip is disposed close to the internal cutting edge 11 of the blade member 10.

On the base 1, there is provided a cutting feeder 14 which comprises a ball screw 12 and a cutting feed motor 13 for rotating the ball screw 12. By this cutting feeder 14, the slide table 3 can slide on the guide rails 2, 2 in a direction perpendicularly intersecting the axis of the main spindle 6 (i.e., a direction from front to rear or from rear to front in FIG. 1, hereinafter referred to as "X-axis direction"). Accordingly, by moving this slide table 3 in the X-axis direction, the work 30 is moved relative to the blade member 10 in a radial direction of the blade member 10 (i.e., the direction of an arrow A1 in FIG. 2). The work 30 is disposed in the central hole of the blade member 10 and is then moved relative to the rotating blade member 10 to slice a part of the work 30 by the internal cutting edge 11 of the blade member 10 for production of a piece of wafer.

Further, the work 30 is fixedly attached with a slice base 31 made of carbon or the like material at a final cut portion where the internal cutting edge 11 finishes the cutting operation of the work 30. This final cut portion corresponds to an outer peripheral edge of the work 30 downstream of the cutting feed direction. The attachment of the slice base 31 on the work 30 aims at preventing the cutting resistance acting on the blade member 10 from being suddenly released upon finish of the cutting operation of the work 30. For the presence of the slice base 31, the final cut of the work 30 can be accomplished without any damage.

A flexure detecting sensor 20 is provided near the blade member 10 for detecting a displacement of the blade member 10 at an inner portion thereof with respect to the Z-axis direction due to a flexure of the blade member 10. The flexure detecting sensor 20 is an eddy current type (i.e., magnetic type). The flexure detecting sensor 20 is located out of a moving zone along which the work 30 moves during the cutting feed operation, and is disposed at a position facing an inner portion of the front side 10a of the blade member 10.

Figure 3:
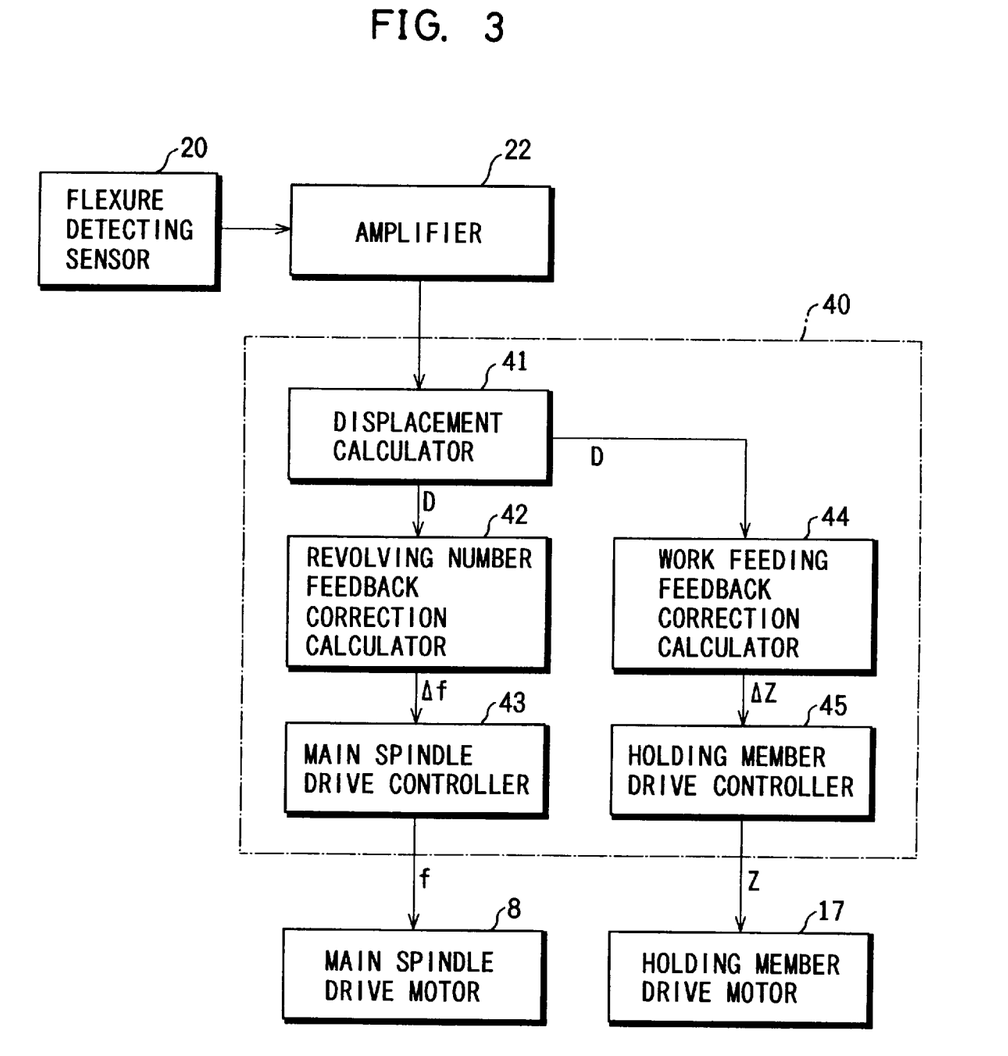
FIG. 3 is a block diagram showing a construction of a controlling portion incorporated in the first slicing apparatus

As shown in FIG. 3, the flexure detecting sensor 20 is connected to a controlling portion 40 by way of an amplifier 22. The controlling portion 40 comprises a displacement calculator 41, a revolving number feedback correction calculator 42, a main spindle drive controller 43, a work feeding feedback correction calculator 44, and a holding member drive controller 45. The revolving number feedback correction calculator 42 and the main spindle drive controller 43 are adapted for controlling the rotation of the blade member 10. The work feeding feedback correction calculator 44 and the holding member drive controller 45 are for controlling the feed of the work 30 in the Z-axis direction.

The displacement calculator 41 stores as a reference position a position of the inner portion of the blade member 10 which is detected by the flexure detecting sensor 20 at a time when the work 30 is moved by the cutting feed motor 13 to a position immediately before the cutting operation is started, i.e., a position immediately before the work 30 comes into contact with the internal cutting edge 11 of the blade member 10. The time when the reference position is detected is hereinafter referred to as "reference time". The position immediately before the work 30 comes into contact with the internal cutting edge 11 is hereinafter referred to as "before-cutting position".

Upon start of the cutting, the displacement calculator 41 calculates a difference between the reference position and a position of the inner portion of the blade member 10 which is detected by the flexure detecting sensor 20 at a specified interval, and outputs thus calculated difference as a displacement D. In other words, the displacement calculator 41 and the flexure detecting sensor 20 constitute a displacement detection portion of the slicing apparatus of the present invention.

The detection that the work 30 has moved to the before-cutting position is accomplished by providing a cutting feed position detector in a cutting feed motor control device 52 or other way.

The revolving number feedback correction calculator 42 calculates a revolving number feedback correction amount $\Delta f$ for correcting the revolution number of the blade member 10 based on the displacement D output from the displacement calculator 41 to reduce the displacement D. The revolving number feedback correction amount $\Delta f$ is calculated according to the following equation:

$$\Delta f = Kf \cdot D$$

wherein Kf denotes a predetermined feedback gain used for changing the revolution number of the blade member, and the positive or negative of $\Delta f$ is determined based on the positive or negative of the displacement of the blade member 10, i.e., the direction of displacement of the blade member 10 in the Z-axis direction.

The main spindle drive controller 43 outputs a control signal to the main spindle drive motor 8 to control the revolution number of the blade member 10. Specifically, the main spindle drive controller 43 controls the main spindle drive motor 8 to rotate the blade member 10 at a predetermined reference revolution number of immediately before start of the cutting. Upon start of the cutting, the main spindle drive motor 8 is driven to rotate the blade member 10 at a revolution number f which is obtained by adding the feedback correction amount $\Delta f$ to the reference revolution number of, i.e., $f=fo+\Delta f$. In other words, the main spindle drive controller 43 and the revolving number feedback correction calculator 42 constitute a blade member rotation control portion of the slicing apparatus of the present invention.

During the control of the revolution number of the blade member 10 by the main spindle drive controller 43, the work feeding feedback correction calculator 44 calculates a work feeding feedback correction amount $\Delta Z$ for correcting the feeding of the work 30 in the Z-axis direction based on the displacement D output from the displacement calculator. 41. The feedback correction amount $\Delta Z$ is adapted for restoring the cutting position of the work 30 which is displaced due to the flexure of the blade member to the reference cutting position. The feedback correction amount $\Delta Z$ is calculated according to the following equation:

$$\Delta Z = Kz \cdot D$$

wherein Kz is a predetermined feedback gain used for feeding the work. Preferably, the feedback gain Kz is set at one or slightly larger than one based on experience. Similar to the feedback correction amount $\Delta f$, the positive or negative of the feedback correction amount $\Delta Z$ is determined based on the positive or negative of the direction of displacement of the blade member 10 in the Z-axis direction.

The holding member drive controller 45 outputs a control signal to the holding member drive motor 17 to control the position of the work 30 under cutting operation with respect to the Z-axis direction. Specifically, the work 30 is advanced to a cutting start position Zo immediately before the start of the cutting in the axial direction of the work 30, i.e., a position where an forward end of the work 30 is beyond the blade member 10 by an amount corresponding to a given thickness of a wafer W to be cut out from the work 30.

Upon start of the cutting, the holding member drive controller 45 controls the holding member drive motor 17 to move the work 30 to a position Z which is obtained by adding the feedback correction amount $\Delta Z$ to the cutting start position Zo, i.e., $Z=Zo+\Delta Z$. In other words, the holding member drive controller 45 and the work feeding feedback correction calculator 44 constitute a work feed control portion of the slicing apparatus of the present invention.

Next, a method of slicing the work with the use of the slicing apparatus will be described.

The controlling portion 40 activates the main spindle drive motor 8 in the rotating driver 5 to rotate the tension disk 9 at the reference revolution number fo. Simultaneously, the controlling portion 40 activates the holding member drive motor 17 in the diving feeder 18 to slidably move the work 30 toward the main spindle 6 along the Z-axis direction while holding the work 30 by the holding member 15. Consequently, the work 30 is advanced from the front side 10a of the blade member 10 to the rear side 10b through the center hole of the blade member 10, and is held at the cutting start position Zo where the forward end of the work 30 is beyond the blade member 10 by a given amount.

Subsequently, the controlling portion 40 activates the cutting feed motor 13 in the cutting feeder 14 to feed the work 30 in a radial direction of the blade member 10 at a specified cutting feed speed. Upon the work 30 having reached the before-cutting position, the flexure detecting sensor 20 detects the position of the inner portion of the blade member 10, and the displacement calculator 41 stores the detected position as a reference position.

After start of the cutting, the blade member 10 flexes due to the cutting resistance and then displaces from the reference position in the Z-axis direction. The displacement D of the blade member 10 in the Z-axis direction is calculated by the displacement calculator 41 at a specified interval. The feedback correction calculator 42 calculates the feedback correction amount $\Delta f$ based on the displacement D to reduce the displacement D. The main spindle drive controller 43 controllably drives the main spindle 8 so that the revolution number f is corrected by implementing the equation: $f=fo+\Delta f$.

The flexure of the blade member 10 during the slicing operation is suppressed by controlling the revolution number of the blade member 10. However, there exists a time period until the displacement D is actually changed after the revolution number f is corrected. This time period is regarded as a time delay in response. This time delay in response makes it impossible to set the feedback gain Kf at a large level. Accordingly, there actually remains a deviation, i.e., a displacement D. For example, in the case where the displacement D is varied as shown in the broken line in FIG. 4 under the condition that the number of revolutions f is not controlled during a time period lasting from the cutting start time t1 to the cutting finish time t2, the displacement D is reduced to the state shown by the solid line in FIG. 4 by controlling the revolution number. However, there still remains the displacement amount D as shown in the solid line. Accordingly, a section of the work 30 (i.e., a section of the wafer W) has a warp because of the remaining displacement D, even though the revolution number is controlled.

Figure 4:
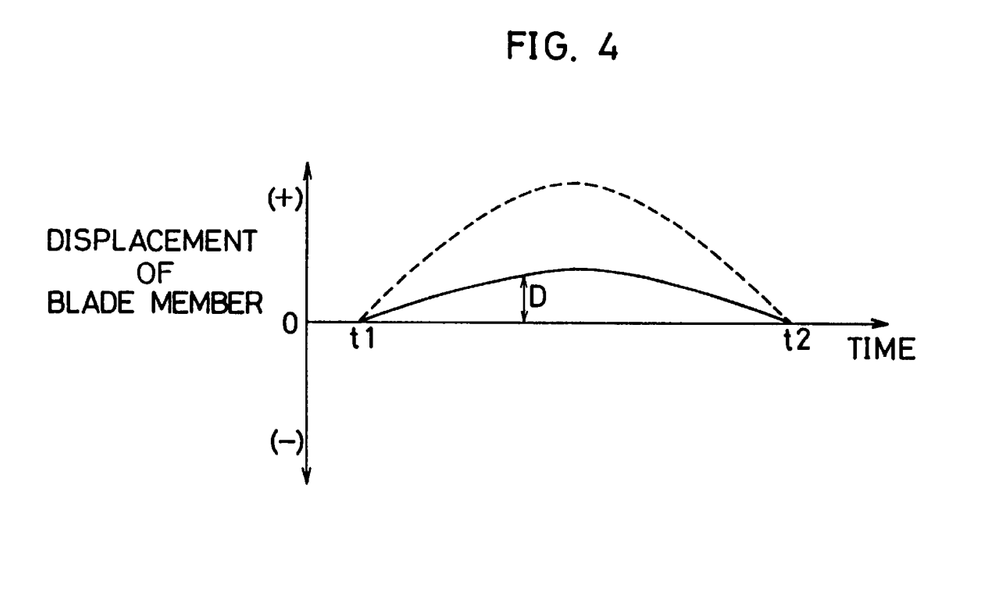
FIG. 4 is a graph showing a variation in the displacement of a blade member with respect to time in a slicing operation.

In order to prevent a warp of a wafer W, the present invention performs work feeding control in the Z-axis direction as well as controlling the revolution number. Specifically, the feedback correction amount '$\Delta Z$ for correcting the feeding of the work 30 in the Z-axis direction is calculated based on the displacement D, and the work 30 is moved along the Z-axis direction in the same direction as the blade member 10 is displaced by the feedback correction amount ΔZ. Accordingly, despite the existence of a displacement D, the work 30 can be restored to the predetermined cutting reference position (i.e., the cutting initial position). Accordingly, a desirably shaped wafer can be obtained with a high accuracy.

TABLE 1 shows results obtained by an experiment in which a wafer W having a diameter of 6 inches is cut out using the slicing apparatus of the present invention and a conventional slicing apparatus which is only capable of controlling the revolution number of a blade member in a state that a work is kept in a stationary state. The wafer obtained by the slicing apparatus of the present invention is hereinafter referred to as the "inventive example", and the wafer obtained by the conventional slicing apparatus is hereinafter referred to as the "conventional example". It should be noted that "Warp" in TABLE 1 is one of the indices representing a warp state of a wafer W and calculated is the maximum value of a space between an underside of a wafer W and a flat top surface of a test bench on which the wafer W is freely placed.

TABLE 1

|  | Inventive Example | Conventional Example |
| --- | --- | --- |
| deviation of thickness in central portion | 100% of 1500 pieces had deviation within ± 10 μm | 98.5% of 1500 pieces had deviation within ± 30 μm |
| Warp | X = 5.36 μm<br>σ = 1.52 μm<br>min = 1.4 μm<br>max = 10.1 μm | X = 7.46 μm<br>σ = 3.75 μm<br>min = 2.0 μm<br>max = 34.3 μm |
| Warp < 20 μm | 100% of 1500 pieces | 98.5% of 1500 pieces |

As can be clearly seen from TABLE 1, the inventive example showed the remarkable reduction in deviation of the thickness in the central portion of the wafer and in the "Warp", compared to the conventional example. Accordingly, it can be understood that a wafer having a stable shape and a high precision is obtainable according to the present invention.

Figure 6:
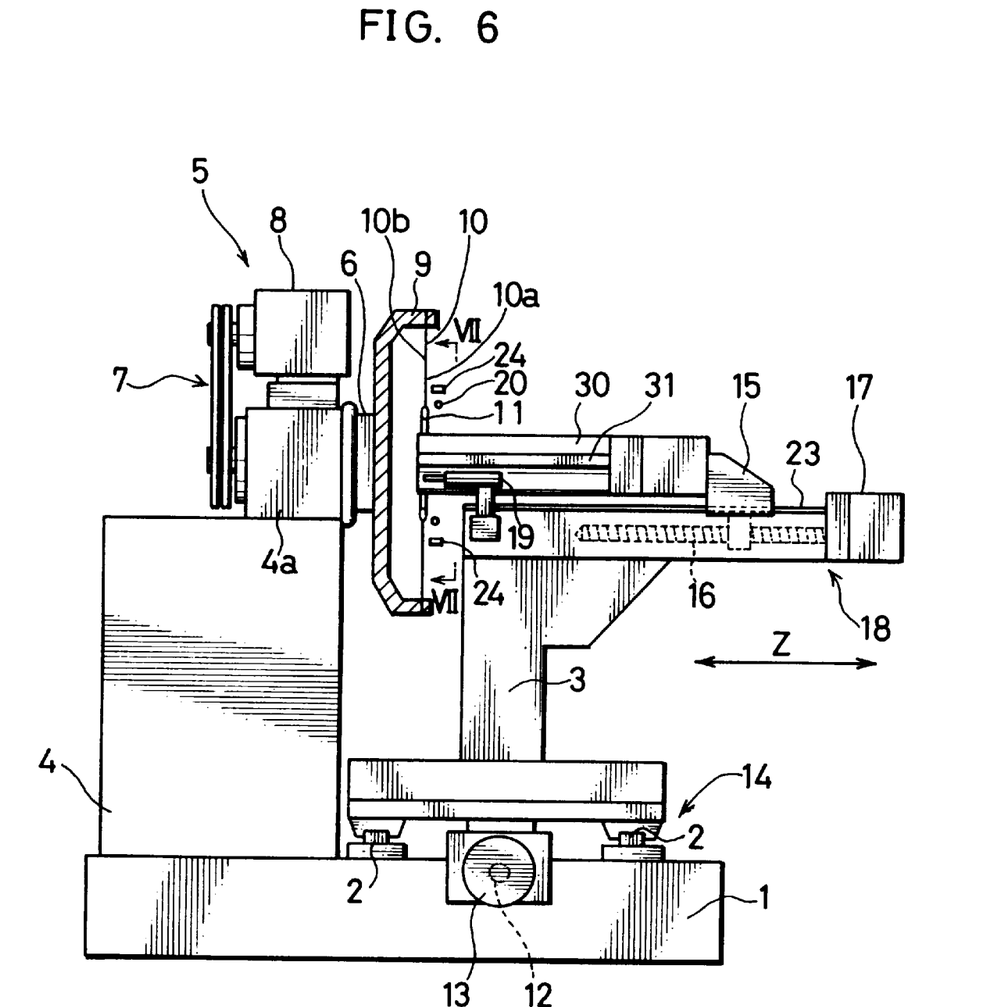
FIG. 6 is a front view showing an overall construction of a slicing apparatus as a second embodiment according to the invention.
Figure 7:
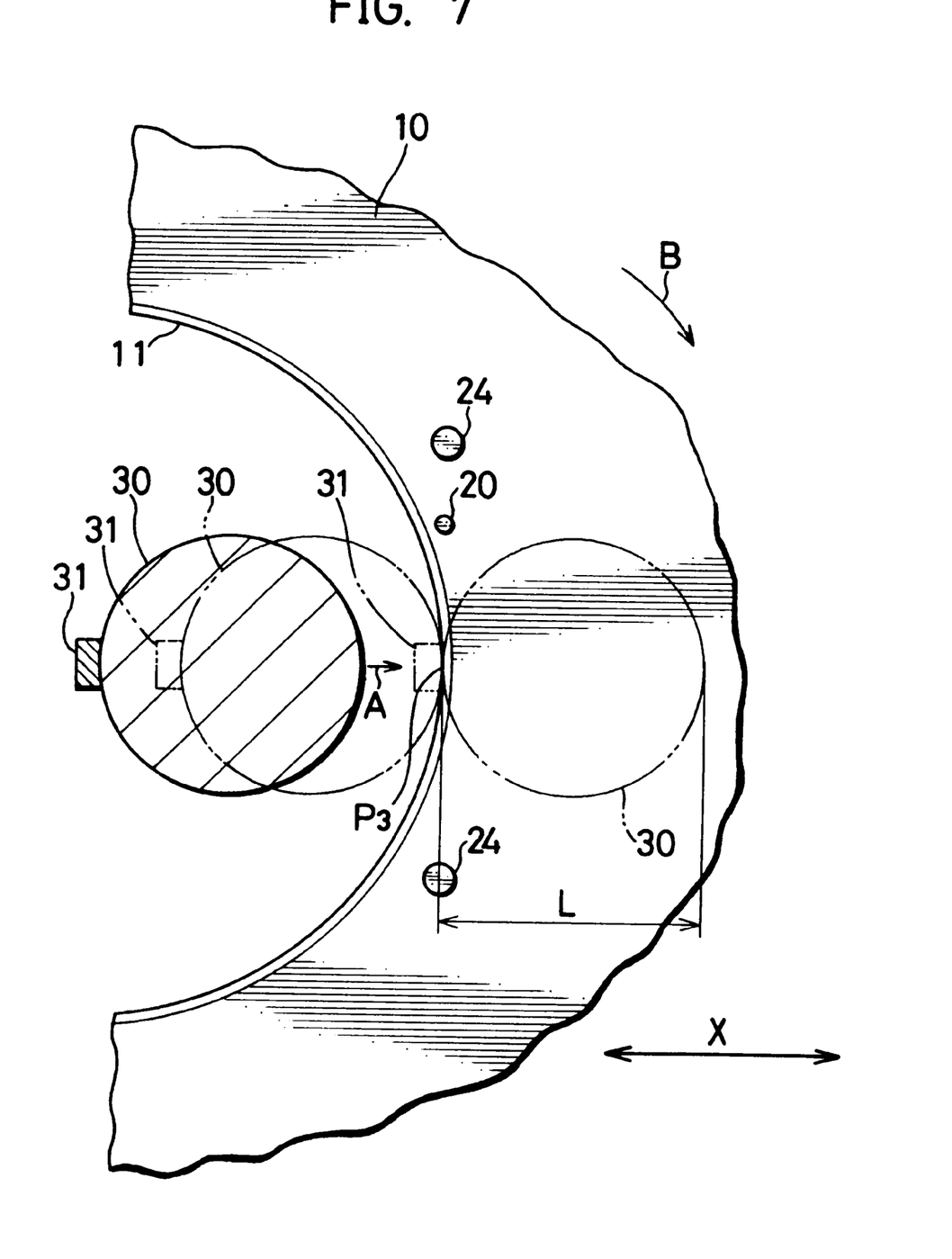
FIG. 7 is a sectional view taken along the line VII—VII in FIG. 6.

A slicing apparatus as a second embodiment of the present invention will be described with reference to FIGS. 6 to 8.

It should be noted that parts of the second slicing apparatus identical to those of the first slicing apparatus are indicated at like reference numerals.

The first slicing apparatus corrects a flexure of the blade member 10 by controlling the revolution number of the blade member 10. In the second slicing apparatus, pressurized air is ejected onto a surface of the blade member 10 so that a flexure of a blade member 10 is corrected by controlling the air pressure applied to the blade member.

More specifically, an air ejector 24 is provided in a specified position facing a side surface of an inner portion of the blade member 10. In the drawing, two air ejectors are provided vertically away from each other. The air ejector 24 ejects high pressurized air toward the side surface of the inner portion of the blade member 10.

Figure 8:
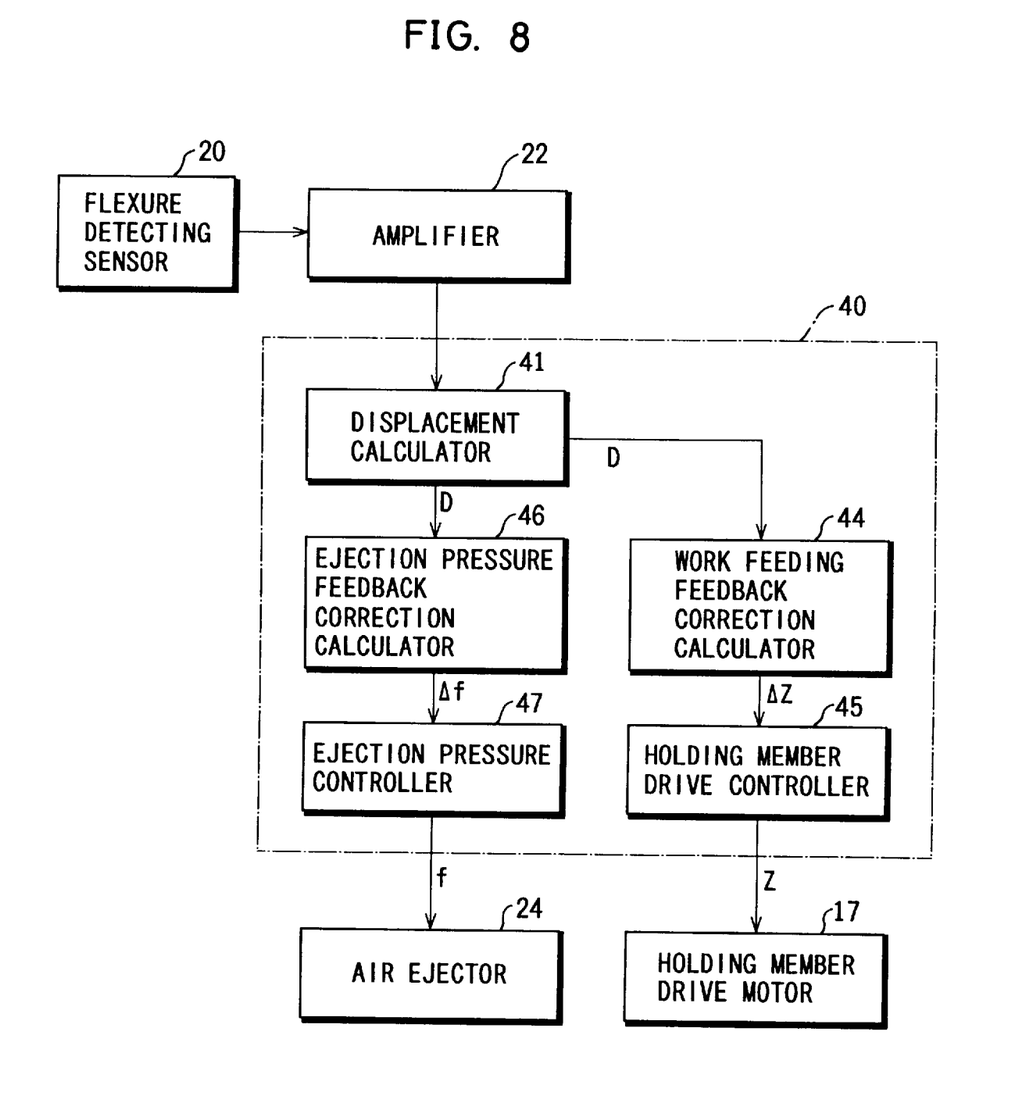
FIG. 8 is a block diagram showing a construction of a controlling portion incorporated in the second slicing apparatus.

As shown in FIG. 8, a controlling portion 40 of the second slicing apparatus is provided with an ejection pressure feedback correction calculator 46 and an ejection pressure controller 47 in place of the revolving number feedback correction calculator 42 and the main spindle drive controller 43 in the first slicing apparatus. The ejection pressure feedback correction calculator 46 calculates an ejection pressure feedback correction amount Δp for correcting the air ejection pressure based on a displacement D output from the displacement calculator 41 to reduce the displacement D.

The feedback correction amount Δp is calculated based on the following equation:

$$\Delta p = K_p \cdot D$$

wherein Kp is a predetermined feedback gain used for changing the air ejection pressure. The positive or negative of the feedback correction amount Δp is determined based on the direction of displacement of the blade member in the Z-axis direction.

The ejection pressure controller 47 outputs a control signal to the air ejector 24 to control the pressure for air ejection. Specifically, the ejection pressure controller 47 controls the air ejector 24 to eject air towards the side surface of the inner portion of the blade member 10 at a predetermined reference pressure Po immediately before start of the cutting. After the cutting is started, the air ejector 24 is controlled to eject air at a pressure P which is obtained by adding the feedback correction amount Δp to the reference pressure Po, i.e., P=Po+Δp. In other words, the ejection pressure controller 47 and the feedback correction calculator 46 constitute a fluid ejection pressure control portion of the second slicing apparatus.

The fluid which is to be ejected to the side surface of the blade member 10 is not limited to air, but gas other than air or liquid including water may be ejected toward the side surface of the blade member 10.

In the foregoing embodiment, the air pressure which is to be ejected to the side surface of the blade member 10 is feedback controlled based on the displacement D to thereby maximally suppress the flexure of the blade member 10 in the slicing operation, and the displacement D which still remains resulting from the time delay in responding to the feedback control of air ejection pressure can be compensated for by controlling the feeding of the work 30 in the Z-axis direction. Accordingly, the work 30 can be sliced into a wafer having a desired shape in section.

The present invention is not limited to the foregoing embodiments, but may be applicable to the following various modifications.

(1) In the foregoing embodiments, the feedback gain Kz for correcting the feeding of the work 30 in the Z-axis direction is fixed at the predetermined value. However, the feedback gain Kz may be variable in accordance with the cutting performance of the cutting edge 11. For example, a newly dressed cutting edge 11 is different from a long used cutting edge 11 in the aspect of cutting performance. Also, there is a difference in the cutting performance between at a time immediately after the cutting is started and a time immediately before the cutting is completed. This difference is remarkable in the case of the diameter L of a wafer W (see FIG. 2) is large. Accordingly, it would be appreciated to change the feedback gain Kz at these time.

Further, when the displacement D is large, the cutting performance of the blade member 10 is liable to be lowered compared to the case where the displacement D is small. Accordingly, when the displacement D is large, the feedback gain Kz is set at a relatively large value to move the work 30 in the Z-axis direction by a large amount. On the contrary, when the displacement D is small, the feedback gain Kz is set at a relatively small value to suppress the work 30 from being moved greatly..

Figure 5:
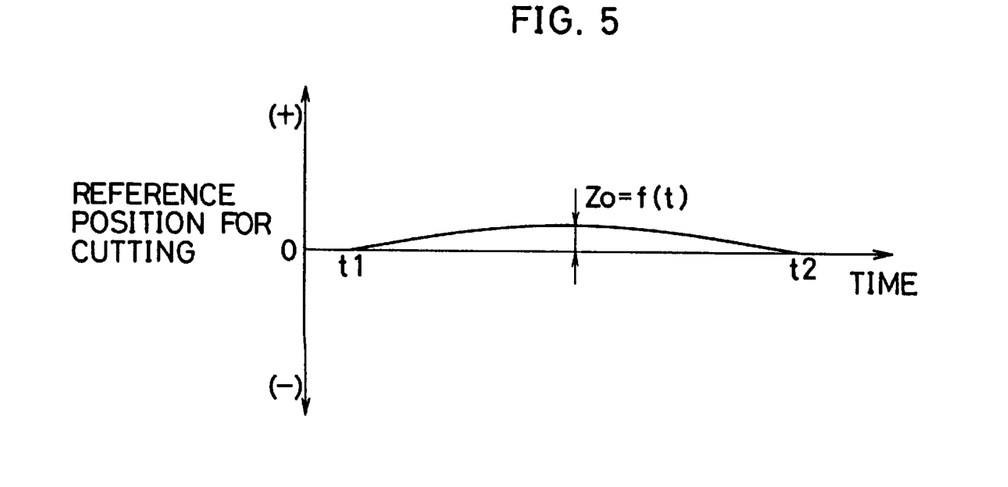
FIG. 5 is a graph showing a variation in the reference cutting position of a work set in the first slicing apparatus with respect to time in a slicing operation.

(2) There may be a case that wafers are cut in a slightly warped state considering the possibility that wafers are deformed in subsequent production processes. In this case, as shown in FIG. 5, the reference cutting position Zo is changed with time t, that is, Zo=f(t), during the slicing operation. Accordingly, wafers having a desirably shaped cutting surface can be produced with a high accuracy as well as flat cutting surface.

It may be theoretically possible to produce a wafer having a cutting surface other than flat cutting surface by intentionally flexing the blade member 10 by changing the revolution number f or the air ejection pressure P during the slicing operation. However, in this case, the following drawbacks occur: 1) The displacement D cannot be well controlled in response to a change in the revolution number f or the air ejection pressure P; and 2) the cutting performance of the blade member 10 is deteriorated because of the intentional flexure of the blade member 10. As a result, the machining accuracy is lowered.

On the other hand, according to the present invention, the work 30 is controllably fed in the Z-axis direction in addition to controlling of the revolution number of the blade member 10 and the air ejection pressure in order to suppress the displacement D of the blade member 10, thereby producing wafers having a desirably shaped surface. Accordingly, an excellent cutting performance and higher machining accuracy can be assured for slicing.

(3) In the foregoing embodiments, the flexure detecting sensor 20 including a magnetic sensor is located out of the moving zone along which the work 30 is moved during the cutting feed operation and is disposed at the position facing the front surface 10a of the blade member 10. However, the sensor 20 may be located within the moving zone and in such a position that a wafer to be cut out from the work 30 intervenes between the blade member 10 and the sensor 20. Further, it is possible to provide a load cell between the work 30 and the holding member 15 to detect a compressive force acting on the work 30 in the Z-axis direction during the slicing operation to thereby calculate a flexure amount of the blade member 10 based on the detected compressive force.

(4) In the second embodiment, one air ejector 24 is arranged at one side of the blade member 10 to eject pressurized air onto one side surface of the blade member 10 in such a manner that the air ejection pressure is increased or decreased in accordance with the direction of flexure of the blade member 10. Alternatively, two air ejectors 24 may be provided at both sides of the blade member 10 to switchingly eject pressurized air onto one of the both sides of the blade member 10 in accordance with the direction of flexure of the blade member 10.

(5) It may be appreciated to use both feedback control of the rotational speed of the blade member 10 and feedback control of fluid ejection pressure as means for suppressing the flexure of the blade member 10.

(6) In the foregoing embodiments, the work 30 is moved in the Z-axis direction to reduce the displacement of the blade member 10. Alternatively, it may be appreciated to move the tension disk 9 in the Z-axis direction. Further, the tension disk 9 may be moved in the X-axis direction for cutting in place of the feeding of the work 30 in the X-axis direction for cutting.

Although the present invention has been fully described by way of example with reference to the accompanying drawings, it is to be understood that various changes and modifications will be apparent to those skilled in the art. Therefore, unless otherwise such changes and modifications depart from the scope of the present invention, they should be construed as being included therein.

What is claimed is:

1. A method of enhancing the accuracy of a wafer cut from a work comprising:
   rotating a blade member having an internal cutting edge in the form of a circle about a center of the circle at a reference revolution speed;
   axially positioning the blade member, in an axial direction of the blade member, relative to the work at a reference axial position with the work positioned out of engagement with the blade member;
   detecting a reference blade position of an inner portion of the blade member in the axial direction with the work positioned out of engagement with the blade member;
   producing a relative movement between the blade member and a work in a radial direction of the blade member so that an end portion of the work is cut by the internal cutting edge of the blade member;
   detecting a deflected position of the inner portion of the blade member and calculating an axial displacement of the blade member from said reference blade position as said blade member engages and cuts the work by finding a difference between the reference blade position and the deflected position;
   multiplying the axial displacement by a first feedback gain value to obtain a revolution speed correction amount;
   controlling the rotational speed of the blade member by varying the reference revolution speed by the revolution speed correction amount, wherein the first feedback gain value is set to maintain the axial displacement at displacement levels corresponding to a position of advancement of the cut in the work;
   multiplying the axial displacement by a second feedback gain value to obtain an axial position correction amount;
   producing a relative movement between a spindle rotating the blade member and the work to effect relative movement between the blade member and the work in an axial direction of the blade member from the reference axial position by an amount equal to the axial position correction amount wherein the second feedback gain value is set so that an actual cutting position of the internal cutting edge with respect to the work is at a predetermined cutting reference position and thereby compensates for the axial displacement which remains due to a time delay in an effect of varying the rotational speed; and
   enhancing the accuracy of the cut wafer by repeatedly performing said steps of detecting a deflected position, multiplying the axial displacement by the first feedback gain value to obtain the revolution speed correction amount, controlling the rotational speed, multiplying the axial displacement by the second feedback gain value to obtain the axial position correction amount; and producing the relative movement between the blade member and the work in the axial direction of the blade member throughout advancement of the cut through the work.

2. A method as defined in claim 1, wherein the predetermined cutting reference position is continuously changed in accordance with the radial relative movement between the blade member and the work.

3. A method of enhancing the accuracy of a wafer cut from a work comprising:
   rotating a blade member having an internal cutting edge in the form of a circle about a center of the circle at a reference revolution speed;

axially positioning the blade member in an axial direction of the blade member, relative to the work at a reference axial position with the work positioned out of engagement with the blade member;

ejecting fluid to a side of the blade member at a preset reference pressure:

detecting a reference blade position of an inner portion of the blade member in the axial direction with the work positioned out of engagement with the blade member and the fluid being ejected to a side of the blade member;

producing a relative movement between the blade member and the work in a radial direction of the blade member so that an end portion of the work is cut by the internal cutting edge of the blade member;

detecting a deflected position of the inner portion of the blade member and calculating an axial displacement of the blade member from said reference blade position as said blade member engages and cuts the work by finding a difference between the reference blade position and the deflected position;

multiplying the axial displacement by a first feedback gain value to obtain an ejection pressure correction amount;

controlling the pressure of the ejection fluid by varying the pressure from the preset reference pressure by the election pressure correction amount, wherein the first feedback gain value is set to maintain the axial displacement at displacement levels corresponding to a position of advancement of the cut in the work;

multiplying the axial displacement by a second feedback gain value to obtain an axial position correction amount;

producing a relative movement between a spindle supporting the blade member and the work to effect relative movement between the blade member and the work in an axial direction of the blade member from the reference axial position by an amount equal to the axial position correction amount wherein the second feedback gain value is set so that an actual cutting position of the internal cutting edge with respect to the work is at a predetermined cutting reference position and thereby compensates for the axial displacement which remains due to a time delay in an effect of varying the pressure; and enhancing the accuracy of the cut wafer by repeatedly performing said steps of detecting a deflected position multiplying the axial displacement by the first feedback gain value to obtain the election pressure correction amount, controlling the pressure multiplying the axial displacement by the second feedback gain value to obtain the axial position correction amount; and producing the relative movement between the blade member and the work in the axial direction of the blade member throughout advancement of the cut through the work.

4. A method as defined in claim 3, wherein the predetermined cutting reference position is continuously changed in accordance with the radial relative movement between the blade member and the work.

5. An apparatus for enhancing the accuracy of a wafer cut from a work comprising:

a blade member having an internal cutting edge in the form of a circle and a spindle rotatably supporting the blade member;

a first driver which rotates the blade member about a center of the circle of the internal cutting edge at a reference revolution speed;

a second driver which produces a relative movement between the blade member and a work in a radial direction of the blade member so that an end portion of the work is cut by the internal cutting edge of the blade member;

a third driver which produces a relative movement between the spindle supporting the blade member and the work in an axial direction of the blade member to effect relative movement between the blade member and the work;

a displacement position detector which detects a position of an inner portion of the rotating blade member in the axial direction throughout cutting of the work;

means for controlling the third driver to axially position the blade member relative to the work at a reference axial position with the work positioned out of engagement with the blade member;

means for controlling the position detector to detect a reference blade position of the inner portion of the blade member in the axial direction with the work positioned out of engagement with the blade member;

means for controlling the second driver to effect cutting of the work in the radial direction;

means for detecting a deflected position of the inner portion of the blade member using the position detector and calculating an axial displacement D of the blade member from said reference blade position as said blade member engages and cuts the work by finding a difference between the reference blade position and the deflected position throughout cutting of the work;

a first controller which controls said first driver to vary a rotational speed of the blade member by an amount $\Delta f$ from the reference revolution speed wherein $\Delta f$ is calculated by multiplying said axial displacement D by a feedback constant Kf limited by a time delay response of said first controller wherein the feedback constant Kf is set to maintain the axial displacement at displacement levels corresponding to a position of advancement of the cut in the work throughout cutting of the work; and a second controller for controlling the third driver to effect an axial relative movement between the blade member and the work based on the axial displacement D so that an actual cutting position of the internal cutting edge with respect to the work is at a predetermined cutting reference position, said second controller controlling the third driver to move the work in the axial direction of the blade member an axial relative movement distance $\Delta Z$ from the reference axial position wherein $\Delta Z$ is determined from multiplying said axial displacement D by a feedback constant Kz to compensate for said axial displacement D resulting from the time delay response effect on said feedback constant Kf to thereby enhance the accuracy of the cut wafer throughout cutting of the work.

6. An apparatus as defined in claim 5, wherein the predetermined cutting reference position is continuously changed in accordance with the radial relative movement between the blade member and the work. is a predetermined cutting reference position.

7. An apparatus for enhancing the accuracy of a wafer cut from a work comprising:

a blade member having an internal cutting edge in the form of a circle and a spindle rotatably supporting the blade member;

a first driver which rotates the blade member about a center of the circle of the internal cutting edge;

a second driver which produces a relative movement between the blade member and a work in a radial direction of the blade member so that an end portion of the work is cut by the internal cutting edge of the blade member;

a third driver which produces a relative movement between the spindle supporting the blade member and the work to effect relative movement between the blade member and the work in an axial direction of the blade member;

a fluid ejector for ejecting fluid to a side of the blade member, said fluid ejector initially ejecting the fluid at a preset reference pressure;

a displacement position detector which detects a position of an inner portion of the rotating blade member in the axial direction throughout cutting of the work;

means for controlling the third driver to axially position the blade member relative to the work at a reference axial position with the work positioned out of engagement with the blade member;

means for controlling the position detector to detect a reference blade position of the inner portion of the blade member in the axial direction with the work positioned out of engagement with the blade member;

means for controlling the second driver to effect cutting of the work in the radial direction;

means for detecting a deflected position of the inner portion of the blade member using the position detector and calculating an axial displacement D of the blade member from said reference blade position as said blade member engages and cuts the work by finding a difference between the reference blade position and the deflected position throughout cutting of the work;

a first controller which controls the fluid ejector to vary an injection pressure of the ejected fluid by an amount $\Delta p$ from the preset reference pressure wherein $\Delta p$ is calculated by multiplying said axial displacement D by a feedback constant Kp limited by a time delay response of said first controller, and wherein the feedback constant Kp is set to maintain the axial displacement at displacement levels corresponding to a position of advancement of the cut in the work throughout cutting of the work; and a second controller for controlling said third driver to effect an axial relative movement between the blade member and the work based on the axial displacement D so that an actual cutting position of the internal cutting edge with respect to the work is at a predetermined cutting reference position, said second controller controlling the third driver to move the work the axial direction of the blade member an axial relative movement distance $\Delta Z$ from the reference axial position wherein $\Delta Z$ is determined from multiplying said axial displacement D by a feedback constant Kz to compensate for the axial displacement D resulting from the time delay response effect on said feedback constant Kp to thereby enhance the accuracy of the cut wafer throughout cutting of the work.

8. An apparatus as defined in claim 7, wherein the predetermined cutting reference position is continuously changed in accordance with the radial relative movement between the blade member and the work.

9. A method according to claim 1 comprising varying said second feedback gain value according to a magnitude of the axial displacement.

10. A method according to claim 1 comprising fixing said second feedback gain value at a predetermined value.

11. A method according to claim 1 further comprising varying said second feedback gain value.

12. A method according to claim 1 further comprising varying said second feedback gain value in accordance with the performance of the cutting edge of the blade member.

13. A method according to claim 1 comprising varying said second feedback gin value according to a diameter of the wafer being cut.

14. A method according to claim 1 comprising varying said second feedback value to one value for a newly dressed cutting edge of said blade member and to another value for a used cutting edge on said blade member.

15. A method according to claim 3 comprising fixing said second feedback gain value at a predetermined value.

16. A method according to claim 3 further comprising varying said second feedback gain value.

17. A method according to claim 3 further comprising varying said second feedback gain value in accordance with the performance of the cutting edge of the blade member.

18. A method according to claim 3 comprising varying said second feedback gain value according to a diameter of the wafer being cut.

19. A method according to claim 3 comprising varying said second feedback gain value according to a magnitude of the axial displacement.

20. A method according to claim 3 comprising varying said second feedback gain value to one value for a newly dressed cutting edge of said blade member and to another value for a used cutting edge on said blade member.

* * * * *